Nov. 9, 1937.    G. S. PIROUMOFF    2,098,357
DELIVERY VEHICLE CHASSIS
Filed Oct. 10, 1936    3 Sheets-Sheet 2

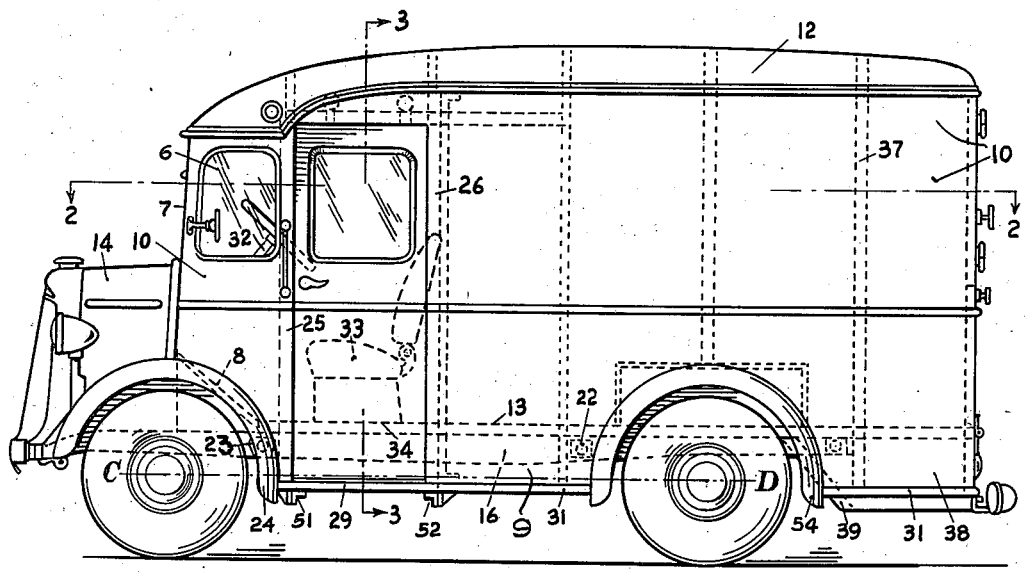

INVENTOR.
GEORGE S. PIROUMOFF
BY Louis Illmer
ATTORNEY.

Nov. 9, 1937.  G. S. PIROUMOFF  2,098,357
DELIVERY VEHICLE CHASSIS
Filed Oct. 10, 1936   3 Sheets-Sheet 3

INVENTOR.
GEORGE S. PIROUMOFF
BY Louis Illmer
ATTORNEY.

Patented Nov. 9, 1937

2,098,357

UNITED STATES PATENT OFFICE 2,098,357

DELIVERY VEHICLE CHASSIS

George S. Piroumoff, New York, N. Y.

Application October 10, 1936, Serial No. 105,037

4 Claims. (Cl. 280—106)

This invention relates to the art of building motorized vehicles and more particularly pertains to a sectionalized truck body carried upon a common chassis of special construction adapted to facilitate door-to-door delivery and wherein the driver is enabled quickly to step out of or into the cab section of my truck as applied to milk, bakery, laundry, parcel post or the like product distribution purposes.

The need on part of the driver to frequently leave his seat when individually handling each such product item during its delivery, is not only fatiguing but time consuming. I therefore resort to a relatively short driver's seat that is symmetrically disposed behind a right-hand or a left-hand drive steering wheel. Located contiguous to the definite ends of such shifted seat, are reversely arranged forward pits respectively provided with a sunken platform that preferably lie one step beneath the floor of my cab section, and one step above the level of the road bed.

My reversely disposed platforms are compactly incorporated wholly within the confines of such forward section to permit a load carrying compartment of large holding capacity to be demountably carried therebehind.

The centralized motor controls are kept within easy reach of a seated driver; while standing erect upon either platform the driver can conveniently slide endwise into his seat from either platform for making a short or more distant haul.

For a left-hand drive for instance, the steering wheel column is correspondingly offset with respect to the longitudinal center-line of the vehicle. The present cab body and chassis construction may, except for the cited platform provision, be designed throughout in accordance with standardized shop practice. My cab body as a whole including its pit platforms, may be completely fabricated prior to setting the same upon its chassis, which facilitates the economical production of trucks on a regular assembly line basis. The arrangement of my cab is such that the assembly can readily be dropped across and removably bolted to a pair of oppositely disposed side channels or the like longitudinal frame members in the customary manner.

Both such forward platforms are inbuilt into my cab structure and fixedly united thereto. The center region of the transverse driver's seat is purposely shifted relative to the longitudinal body center-line. In order that each such pit may be brought close to the respective seat ends, one pit platform is made to extend inwardly from its contiguous body sidewall to a greater distance than the other platform. To permit of an unobstructed chassis mounting of my improved cab, one such frame member is laterally inset between the respective aligned member ends to accommodate said extended pit platform. Otherwise the same standard parts such as suspension springs and hangers therefor, motor mountings, steering gear, propeller shaft and the like chassis components may be kept identical with those of a conventional line of trucks when built without any depressed body platforms.

My truck may be independently fabricated as a cab unit and a rearward load carrying body unit, in which event my complementary pit platforms are confined to the cab unit. The rear section or loading space can then be interchangeably made up as a van, express, stake or any other kind of composite body. My cab is so arranged that its transverse rear body wall or parting plane is preferably made to fall within the forward half length of the wheel base. To this end, the reciprocative motor drive is mounted over the front wheel axle. Because of lack in structural continuity of a sectionalized body installation, the underlying frame channels are subjected to a concentrated downward loading in the region of said parting plane; that is to say, a corresponding unitary body does not impose a combined bending and twisting strain of equal magnitude since such installation tends to mutually stiffen the long frame members. In the case of a sectionalized body, the laterally inset portion of my deflected side channel falls directly beneath and across such parting plane and hence is more likely to suffer severe deformation. The present aim is to so brace and reenforce such a chassis channel that all abnormal sag or other flexure may be adequately overcome without any undue weakening of the flanges thereof.

The primary object of this invention is to provide for a simple chassis structure of the character indicated that shall provide for an optimum of loading space for a given wheel base and that can be fabricated on a standardized productive basis at corresponding low first cost.

Embodied herein are also certain other novel frame features that will presently be more explicitly pointed out. Reference is had to the accompanying three sheets of drawings which are illustrative of different embodiments and in which drawings:

Fig. 1 is an elevational side view of a truck body assembly equipped with my improvements.

Fig. 2 represents a cross-sectional top view thereof as seen along the line 2—2 of Fig. 1, while

Figure 4:
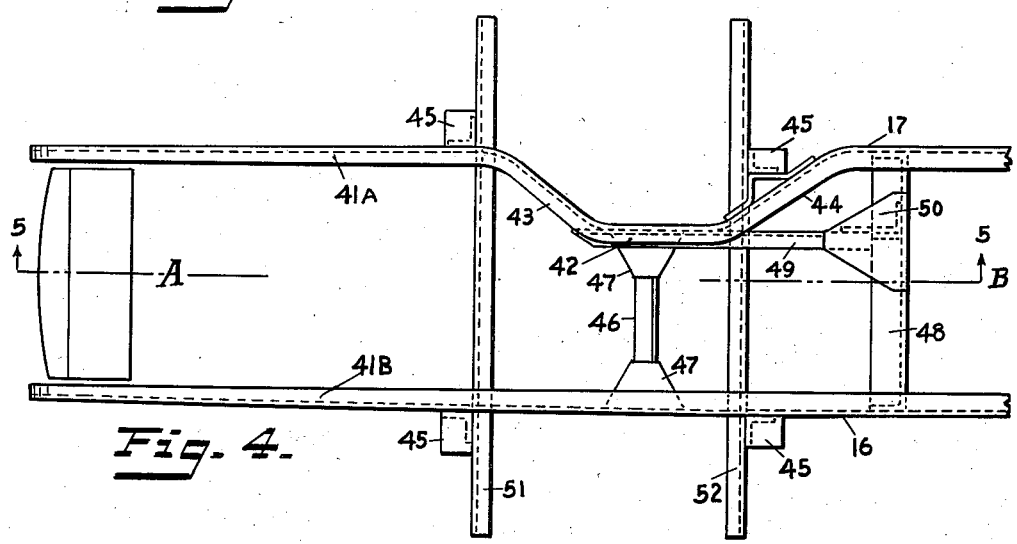
Figure 5:
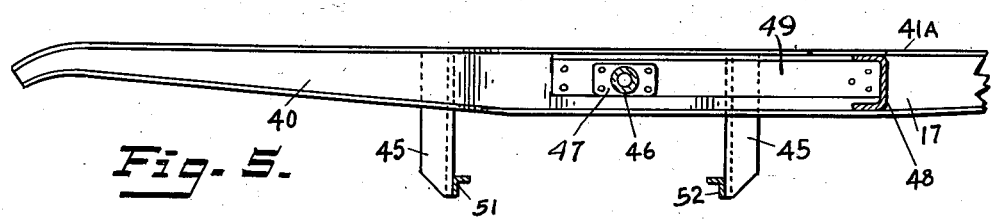

Fig. 4 partially details a plan of channeled frame members, and Fig. 5 depicts a sectional view along 5—5 of Fig. 4.

Figures 6, 7:
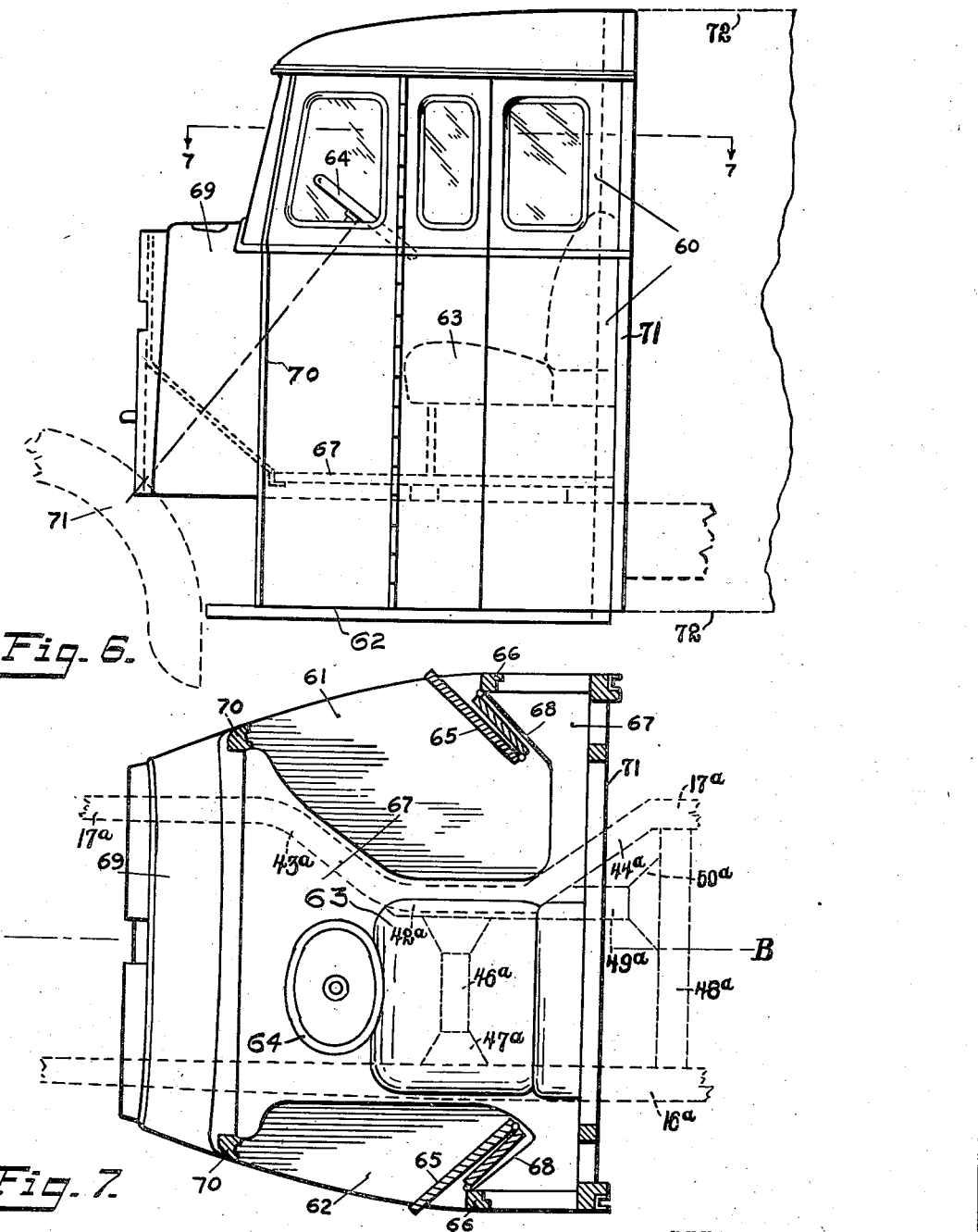

Fig. 6 is similar to Fig. 1 but fragmentally shows a modified body arrangement in that a cab unit is mounted forwardly upon a chassis, and of which Fig. 7 corresponds to the Fig. 2 layout.

Figure 3:
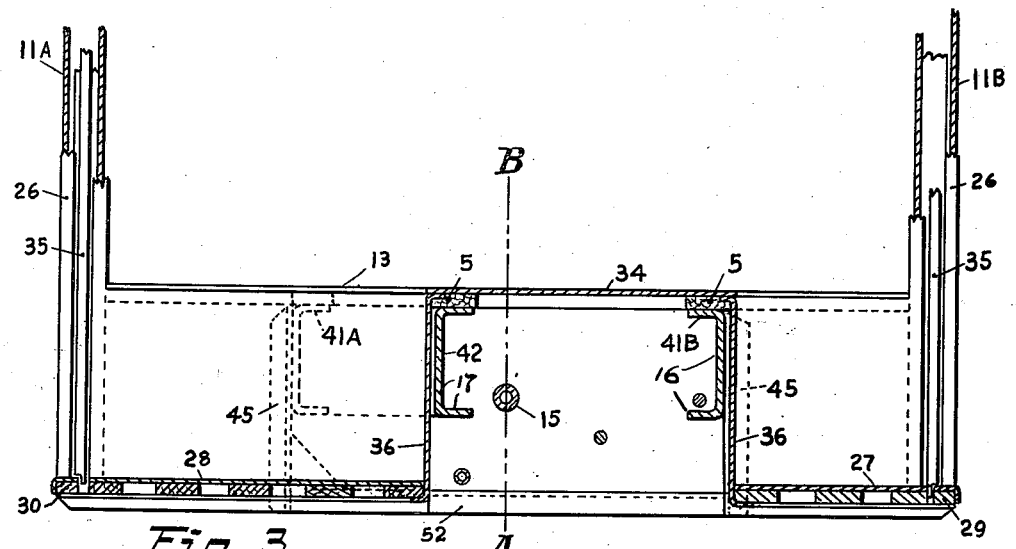
Fig. 3 shows a transverse cross-sectional view taken along 3—3.

Referring first to Figs. 1 to 3, this assembly may comprise a cab section and a loading section respectively having common complementary sidewalls such as 11A and 11B, a deck 12 and a main floor 13 that may be supported upon the usual underlying sills. The forward body end or cab section is shaped to cooperate with a cowl hood 14 having a dash controlled engine enclosed therein that is operatively connected by a propeller shaft 15 to differentially drive the rear wheels in a conventional manner.

The chassis, except for a special frame configuration presently to be defined, preferably follows standardized construction, and as such comprises a pair of reversely disposed longitudinal channels or frame members 16 and 17 that are laterally spaced with respect to the body center line A—B as in Fig. 3.

It is preferred to compactly mount the motor weight centrally in a substantially balanced relation over the front wheel axle and to extend the driver's section 18 and its windshield 7 forwardly thereover, as shown. Such cab section may be partitioned from the rearward load carrying body section by a transverse parting wall 19 provided with a horizontally slidable door 20 of which the sill lies on a level with the cab floor 13. The sheathed sidewalls 11A and 11B that uphold the deck, are respectively buttressed by a series of upright body posts such as 21A, 21B, etc., certain of which extend beneath the main floor 13 to the platform level. The bottom edge of each sidewall skirt portion 9 is carried downwardly beneath the main floor level and terminates in a metallic rub moulding 31. Such facing provided for a finished body trim that extends lengthwise in a common level with the respective platforms and is continued beyond the rear wheel mud guard 54. The rear compartment end may be closed by suitable tail doors.

As will be understood, the front and rear axles are spring suspended from separate standardized hanger means such as 22 and 23 that may reach outwardly or depend from their respective chassis beams 16 and 17. The depending rear terminals of each semi-circular mud guard 24 are concentrically disposed to closely clear the perimeter of each front wheel tire. Immediately adjacent to the rearmost confines of each such guard and within a distance of not more than three-fourths of the diameter of said perimeter away from the front wheel axis, there is erected a body post 25 shaped to constitute a forward door jamb. A mated jamb 26 is spacedly located to the rear thereof. Both complementary jambs of each side doorway may extend beneath the main floor to the level of a depressed platform such as 27 or 28, which respectively form an integral constituent of the cab structure. These inbuilt pit platforms obviate broken floor gaps that would otherwise tend to weaken the assembled body while being handled prior to installation upon its chassis.

A permanent uniting of the door jambs 25 and 26 to their platforms, further contributes to an inherently rigid body assembly.

One such forward platform designated 27 is purposely kept relatively short as a passageway in a direction crosswise of the longitudinal center-line A—B to extend inwardly from the contiguous door sill 29 to the outer web face of the straight longitudinal channel 16, said platform being disposed at a level that is one step lower than the main floor. The passageway of the companion platform 28 is kept relatively longer and extends inwardly from its sill 30 closely contiguous to said body center-line A—B as in Fig. 2. A pan shaped metal sheath or the like sectionalized inset lining 36 serves to both reenforcingly brace and interiorly trim the depending sidewalls and platform of each such forward pit. The marginal edges of such inset linings may be sealed to the floor to prevent road splash from entering the cab section. When the vehicle body 10 is set down upon and secured to the framework as intended, clearance for the longer of these platforms is provided by laterally insetting and reenforcing the channel 17 intermediate its ends, in a manner that will presently be defined.

For a left hand Fig. 2 drive, the axial center of the steering wheel column 32 would be correspondingly shifted with respect to the body center-line A—B. A raised driver's seat 33 of short length is shown transversely mounted upon the narrow main floor ridge 34. The upturned face of this ridge extends between the innermost edge confines of the respective platform pits and the seat length is given approximately a like dimension. The medial seat region may be symmetrically disposed relative to the offset steering wheel axis. After having stepped upon either depressed platform from the road level, the driver may by a dexterous bodily shift, conveniently seat himself behind such steering wheel and thereupon lift his feet into engagement with the foot control pedals. When dismounting for the delivery of goods, the driver need merely shift bodily toward one seat end and then step down onto one or the other of said platforms. A separate sliding door such as 35 may serve to close the front doorway leading to the respective platform pits, it being preferred for left hand driving to locate the longer of such platforms on the right body side away from any fast passing traffic. The use of the twin platforms 27 and 28 facilitates rapid product delivery without having to walk around the parked vehicle.

As represented in dotted outline in Fig. 1, the main floor 13 extends forwardly along a common level up to the inclined toe board 8 of my cab, which board may be supported by said floor. The platform carrying pits 27 and 28 are sunk therein in such fashion that said flooring sharply defines the respective top edges of such mated pits. The main floor together with its aligned ridge face is kept raised sufficiently to allow the propeller shaft 15, brake rods and the like chassis accessories to be unobstructedly carried beneath said face and between the innermost depending sidewalls of the sunken pits. The narrow ridge component 34 integrally interconnects the fore and aft floor sections to stiffen the main floor structure against heavy body loading and maintain a flush unbroken floor level.

An important objective of my cab arrangement is to secure the maximum of loading space for a given wheel base. This end is in part attained by inbuilding the pit platforms into my demountable cab structure, which permits of crowding both forward door jambs 25 toward the front wheel axis. The permissible sharp lateral offset in my frame member 17 affords an advantage in this regard over the use of a long sweep drop frame and also provides for a greater effective clearance with respect to the road bed for a specified tire diameter.

My chassis frame members 16 and 17 may either overhangingly project rearwardly to underlie the tail end of the body or they may be cut off adjacent to a rear spring hanger of the wheels as in Fig. 1. When the latter construction is resorted to, the body interior may be further partitioned transversely at 37 crosswise of the posts 21D. The main floor therebeyond is shown dropped to provide for a rear body well or pit 38 whose stepped floor level preferably lies in substantial alignment with the platforms 27 and 28. The overhanging body tail end may then be reenforcingly upheld drop frame fashion by a pair of depending brace brackets such as 39 of which one end may be fixedly attached to the rear terminal of a contiguous frame member.

From the foregoing disclosure, it will be evident that my cab section together with the inbuilt platforms thereof, may be lifted off the chassis upon which the body sills demountably rest. In accordance with common practice, such body sills may be provided with distributed angle irons or the like bracket projections by which to snugly bolt and thereby tie down the body to the understructure against inadvertent displacement while en route. By virtue of my design refinements and irrespective of whether or not a sunken platform such as 28 is provided for, the front spring suspension, including the complementary frame supported hangers thereof, the motor mounting, the steering gear and control pedals as carried by my chassis may without interference, be kept identical in structure with corresponding standardized adjuncts now being generally used for complementary frames that are both kept axially straight between the respective ends thereof.

Referring now to Figs. 4 and 5, these detail a preferred style of my longitudinal frame members 16 and 17, which are shown fabricated from rectilinear cross-sectionally channel shaped beams whose respective upright webs such as 40 taper toward the ends thereof. The mated channel flanges 41A and 41B are inturned toward each other and laterally spaced apart to a lesser overall distance than the body width. The frame member 16 may be kept substantially straight throughout its length, while a deflected medial portion of the continuous companion member 17 is sharply bent laterally inward toward the body center-line A—B, as shown. The last named member is shaped to comprise a comparatively short inset straight component 42 disposed in substantial parallelism with the aligned frame ends thereof. A pair of obliquely disposed components 43 and 44 respectively interconnect said straight component with such channel ends in integral formation. These reversely inclined components stiffen the frame gap against any thrust that be imposed between the channel ends. The inset gap provides clearance space in which to accommodate the longer forward platform 28, the corresponding innermost platform edge being preferably carried closely adjacent to the deflected channel component 42 as in Fig. 2.

My side channel 17 is preferably cold bent by dies between the ends thereof after having initially been formed in a straight length in the manner of its mated channel 16. Such fabrication is herein permissible for the reason that the flanges 41A are comparatively narrow in relation to the deep web 40, hence allowing of a corresponding abrupt cold bending whereby to throw the rearward end of the oblique component 43 well forward toward the front wheel axle without requiring any change in disposition of the standardized spring hanger 23.

If desired, certain of said channel components may be provided with depending brackets such as 45 respectively arranged to support a pair of transversely overhanging angle iron beams 51 and 52 that constitute a reenforcing cradle on which to removably crate the platforms 27 and 28 when the body is dropped in place upon the frame members. Said transverse beams also reenforce my frame members against axial twist and are fixedly attached to the web 40 by the brackets 45 without detriment to the frame flanges 41A and 41B. To further provide for adequate torsional rigidity in the offset region of the frame member 17, I preferably interconnect its component 42 with the member 16 by a tubular transverse brace 46. The tube ends may respectively be welded to flanged sockets such as 47 adapted to be fixedly secured to the webs of such laterally spaced channels.

Said frame members may additionally be equipped with a channeled cross member 48 whose ends are respectively bracketed and riveted in place. A medial region of said cross member is in turn connected to the frame component 42 by a channeled tie piece or longitudinally disposed strut member 49. One end of such reenforcing strut may be interiorly nested within and fastened to the frame component 42 while the opposite strut end may be provided with double gusset plates 50 that overlap the abutting cross member 48 so as to effectively counteract sag of said inset component under extreme downward loading and to generally augment the rigidity of the offset channel in its gap region. All such frame beam reenforcements are purposely confined within the beam depth and fastened directly to the web 40 without weakening either of the channel flanges 41A or 41B to leave a pair of flush upturned surfaces for the reception of the body sills 5 therealong. As a substitute for the bent continuous frame member 17, such beam may also be sectionalized and welded or riveted together to similarly counteract chassis weave.

The bottommost flange of my laterally offset frame beam is preferably kept above the horizontal line C—D that interconnects the front and rear wheel centers. The platform level may fall somewhat below said line while still maintaining the transverse angle irons 51 and 52 at an adequate distance above the road bed. Such bridging angle irons are located beneath the bottom flanges of my frame channels to provide for a clearance space equal to the web depth wherein to unobstructedly mount the propeller shaft together with the engine mounting equipment inclusive of its attached gear shifting housing.

The cab body laterally overhangs the overall width spacing of my frame channels 16 and 17 and the projecting ends of the transverse beams 51 and 52 serve to stiffen the sill edges of the platforms and the door jambs erected thereon. If desired, such beams may be extended outwardly beyond the door sills to support a narrow running board shaped to constitute a tool box such as 53 that is schematically shown by dotted outline in Fig. 2.

In Figs. 6 and 7 there is shown a modified body arrangement in that the cab unit 60 is built up as an independent unit adapted to have a load carrying body unit interchangeably mounted therebehind. Both such separately fabricated units rest upon the described chassis beams but in this instance, the forward platforms 61 and 62 are inbuilt and confined to said cab which is located within the forward half of the wheel base length C—D. The longer platform 61 is shown inset into the cited frame gap and the raised driver's seat 63 is shifted leftward in substantial alignment with the axis of the steering wheel 64. In this alternative cab design, each side door 65 is of the double hinged, collapsible type mounted upon the body post or jamb 66 that again extends from the deck downwardly to its platform and beneath the level of the main floor 67.

In order to clear the inward swinging of the door 65, the superficial platform shape is modified by providing for a flared pit sidewall 68 against which the open door abuts. The cowl 69 for the cab is enlarged over the Fig. 1 showing but such details are discretionary, the aim in either case being to crowd the complementary side door jambs 70 closely adjacent to the front wheel mud guard 71 to afford a relatively large loading space rearward of said cab.

Important advantages are afforded when the Fig. 4 frame cross-braces are applied to the Fig. 7 chassis. It will be observed that the inclined rear channel component 44A then underlies the transverse rear cab end 71 which unit in this instance is kept separable from the forward end of the load carrying compartment 72 (schematically represented in dotted outline). The offset frame region 42A contiguous to such upright parting plane 71 has in practice been found to need substantial reenforcement to prevent excessive sag and weave under severe downward loading or possible collision impact. Comprehensive drop and road tests have demonstrated that the defined frame brace is capable of fully remedying the cited detrimental defects, particularly by extending the longitudinal strut 49A normal to such parting plane in the manner shown.

The foregoing rather explicit disclosures are thought to make apparent to those skilled in this art, the advantages afforded by my improved body structure, it being understood that various changes in the illustrative embodiments thereof may be resorted to, all without departing from the spirit and scope of my invention heretofore described and more particularly pointed out in the appended claims.

I claim:

1. In a motor driven vehicle provided with a demountable body equipped with a depending pit platform extending inwardly from a body side one step beneath the body floor level, the combination of a chassis comprising front and rear wheel axles suspending thereacross a pair of longitudinally continuous frame channels that respectively lie in spaced relation within the confines of their contiguous body sides, one such channel in the forward half of the wheel base being medially offset and laterally deflected toward its mate on a level lying above the wheel centers to accommodate the aforesaid platform, and means cross-bracing said frame channels, said means including bracket means depending from each such channel and an interconnected transverse beam extending crosswise beneath said channels and outwardly beyond said one channel to reenforcingly uphold said platform.

2. In a motor driven vehicle including a body provided with a pit platform extending inwardly from a body side one step beneath the body floor level, a chassis comprising a pair of longitudinally continuous frame channels that respectively lie in spaced relation within the confines of the body sides, one such channel being medially offset and laterally deflected toward the other channel to constitute an inset frame component that accommodates the aforesaid platform, a transverse brace fixedly interconnecting said inset frame component with the other channel, a mated cross member interconnecting said frame channels in laterally spaced relation to said brace, and an interposed strut extending between the cross member and said brace.

3. In a motor driven vehicle provided with a demountable body equipped with a depending pit platform extending inwardly from a body side one step beneath the body floor level, the combination of a chassis comprising front and rear wheel axles suspending thereacross a pair of longitudinally continuous frame channels that respectively lie in spaced relation within the confines of the body sides, one such channel being medially offset and laterally deflected toward its mate on a level lying above the wheel centers to unobstructedly accommodate the aforesaid platform, complementary depending brackets attached to the web of each such frame channel, and a separate transverse beam attached to the respective lower end regions of corresponding brackets of each frame channel, said beams extending laterally beyond said one channel to constitute a cradle structure serving to impart rigidity to said platform against downward loading.

4. In a motor driven vehicle including a body provided with a pit platform, a chassis comprising a pair of longitudinally continuous frame channels arranged in spaced relation to uphold said body thereacross, one such channel in the forward half of its length being medially offset and laterally deflected inwardly toward the other channel to accommodate the pit platform, said channel offset being shaped to include reversely inclined oblique components that are interconnected by an inset rectilinear component, and means reenforcing said inset channel component, said means including a transverse brace member and a spaced cross member having a strut interposed therebetween and which strut extends in substantial parallelism with said rectilinear component to augment the rigidity of such channel offset against downward loading.

GEORGE S. PIROUMOFF.